(12) United States Patent
Kress et al.

(10) Patent No.: US 12,007,655 B2
(45) Date of Patent: Jun. 11, 2024

(54) OPTICAL ATTENUATION VIA SWITCHABLE GRATING

(71) Applicant: Microsoft Technology Licensing, LLC, Redmond, WA (US)

(72) Inventors: Bernard Charles Kress, Redwood City, CA (US); Ashley N Saulsbury, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 378 days.

(21) Appl. No.: 17/330,161

(22) Filed: May 25, 2021

(65) Prior Publication Data
US 2022/0382054 A1    Dec. 1, 2022

(51) Int. Cl.
  *G02B 27/01* (2006.01)
  *G02F 1/1334* (2006.01)
  *G02F 1/1347* (2006.01)
  *G02F 1/29* (2006.01)

(52) U.S. Cl.
  CPC ....... *G02F 1/1347* (2013.01); *G02B 27/0172* (2013.01); *G02F 1/13342* (2013.01); *G02F 1/292* (2013.01); *G02B 27/0101* (2013.01)

(58) Field of Classification Search
  CPC .... G02F 1/1347; G02F 1/13471; G02F 1/136; G02F 1/1334; G02F 1/13342; G02F 1/13345; G02F 1/292; G02F 1/293; G02F 1/294; G02F 1/29; G02F 1/31; G02F 2203/48; G02B 27/0172; G02B 27/017; G02B 27/0175; G02B 27/0101; G02B 27/0103; G02B 2027/0105; G02B 2027/0118; G02B 6/0076; G02B 6/0011
  See application file for complete search history.

(56) References Cited

U.S. PATENT DOCUMENTS

| | | | |
|---|---|---|---|
| 2010/0067086 A1* | 3/2010 | Khan | H04N 9/3161 359/239 |
| 2011/0063604 A1 | 3/2011 | Hamre et al. | |
| 2016/0195720 A1* | 7/2016 | Travis | G03H 1/2205 359/19 |
| 2017/0329140 A1* | 11/2017 | Yeoh | G02B 6/0083 |
| 2018/0074352 A1* | 3/2018 | Popovich | G02B 27/4272 |
| 2018/0188631 A1* | 7/2018 | Lu | G02B 5/30 |
| 2018/0341129 A1 | 11/2018 | Lentz | |
| 2019/0113829 A1* | 4/2019 | Waldern | G02B 27/0172 |

OTHER PUBLICATIONS

"International Search Report and Written Opinion Issued in PCT Application No. PCT/US22/026858", dated Sep. 6, 2022, 10 Pages.

* cited by examiner

*Primary Examiner* — Hoan C Nguyen
(74) *Attorney, Agent, or Firm* — Alleman Hall & Tuttle LLP

(57) ABSTRACT

Examples are disclosed relating to tunable attenuation of incident light using a switchable grating. One example provides an optical attenuator comprising a switchable grating configured to diffract light within a wavelength band at a diffraction angle. The optical attenuator further comprises an electrode pair configured to apply a voltage across the switchable grating to tune a proportion of incident light diffracted at the diffraction angle, and an optical dump to receive the proportion of incident light diffracted.

19 Claims, 9 Drawing Sheets

OPTICAL ATTENUATION VIA SWITCHABLE GRATING

BACKGROUND

Display devices may raster scan one or more laser beams while controlling a brightness of each to display an image. In the case of a head-mounted display (HMD) device, the delivery of such images using a transparent combiner placed in front of the eye allows for the display of augmented reality images in which virtual holograms appear to be mixed with real world objects.

SUMMARY

Examples are disclosed that relate to tunable attenuation of light using a switchable grating. One example provides an optical attenuator comprising a switchable grating configured to diffract light within a wavelength band at a diffraction angle. The optical attenuator further comprises an electrode pair configured to apply a voltage across the switchable grating to tune a proportion of incident light diffracted, and an optical dump to receive the proportion of incident light diffracted. Examples are also disclosed that relate to devices utilizing such attenuators, including display devices and other types of optical devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a display device, such as a head-mounted display (HMD), may utilize a scanning laser projector to raster scan an image for display. However, in some low-light environments, the display luminosity of such a display device may be too bright for some mixed-reality/augmented reality use cases. For example, when using a head-mounted display device in a low-light environment, a relatively bright display may cause a user's pupil to constrict, thus making it difficult to see the surrounding environment. Similarly, a relatively low brightness display may be desirable for night photography, and for other low light uses.

Figure 1:
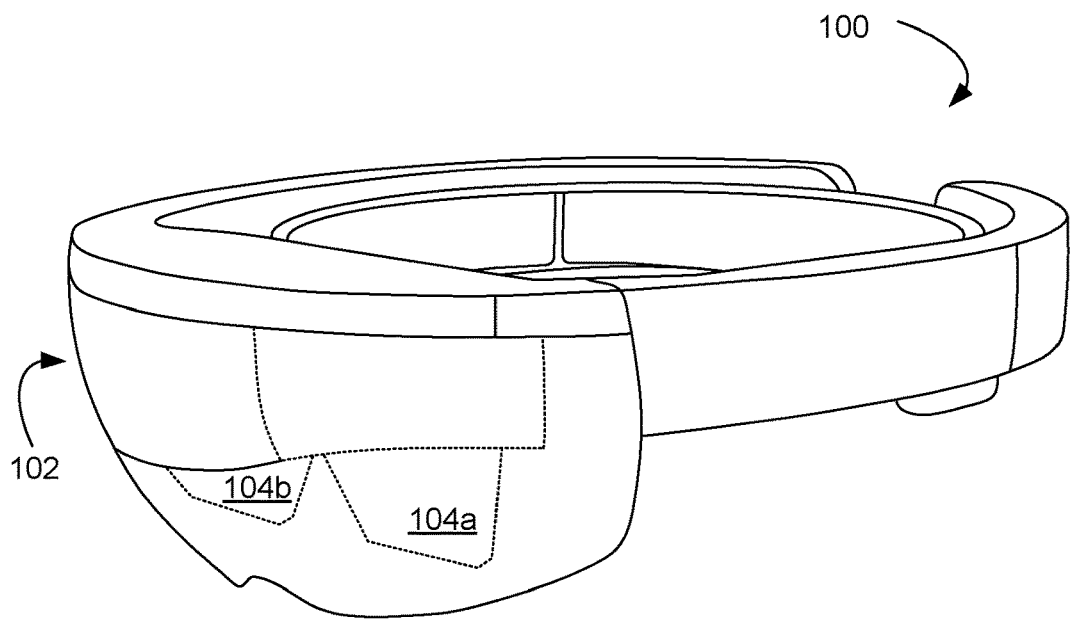
FIG. 1 shows an example wearable optical device.

FIG. 1 shows an example head-mounted display system 100 including a display device 102 positioned near a wearer's eyes. Display device 102 includes left-eye and right-eye displays 104a, 104b each comprising see-through waveguide combiners positioned to display virtual imagery in front of a view of a real-world environment to enable augmented reality applications, such as the display of mixed reality imagery. In other examples a display device may include a single display extending over one or both eyes, rather than separate right and left eye displays. Display device 102 includes an image producing system, for example a laser scanner, a liquid crystal on silicon (LCoS) microdisplay, a transmissive liquid crystal microdisplay, or digital micromirror device (DMD), to produce images for display.

As described above, in some low-light environments, it may be advantageous to lower the brightness of display device 102. However, achieving suitable low brightness operation may be pose various challenges. For example, one possible solution is to dim a laser by modulating current supplied to drive the laser.

However, it may be difficult to dim the laser beyond a threshold in this manner, as laser operation at such low current levels may be unstable.

Instead of controlling the laser brightness directly by modulating current provided to the laser, various mechanical devices may be used for optical attenuation, such as devices that utilize voice coils, piezoelectric actuators, MEMS (micro-electromechanical systems) devices, or mechanical actuators. However, these devices may be slow, bulky, and/or power hungry, and may lead to unsuitable insertion losses. As another option, fiber pigtailed attenuation with integrated variable optical attenuators may be used. However, the pigtailing of each laser may be bulky, and add costs and insertion losses to the system. Such costs may be multiplied for full-color systems that utilize red, green and blue lasers.

Accordingly, examples are disclosed that relate to attenuation of light using a solid-state wavelength-selective attenuator system comprising a switchable grating that diffracts a tunable proportion of light toward an optical dump (e.g. a suitable absorber, reflector or an optical path exiting the device) based on an applied voltage. The remaining proportion of light passes through the attenuator, thereby delivering attenuated light to the intended destination. The disclosed example attenuator systems may provide high repeatability, fast response times, power efficiency, wavelength selectivity, and compact size, and avoid unsuitable insertion losses.

Further, the disclosed systems may achieve high dynamic range with regard to diffraction efficiency, allowing the tunable attenuation of a proportion of incident light between 1% and 99% in some examples. Additionally, as the switchable grating can have a planar configuration, an optical attenuator according to the disclosed examples may be compactly incorporated into different devices, some examples of which are described below.

Figure 2:
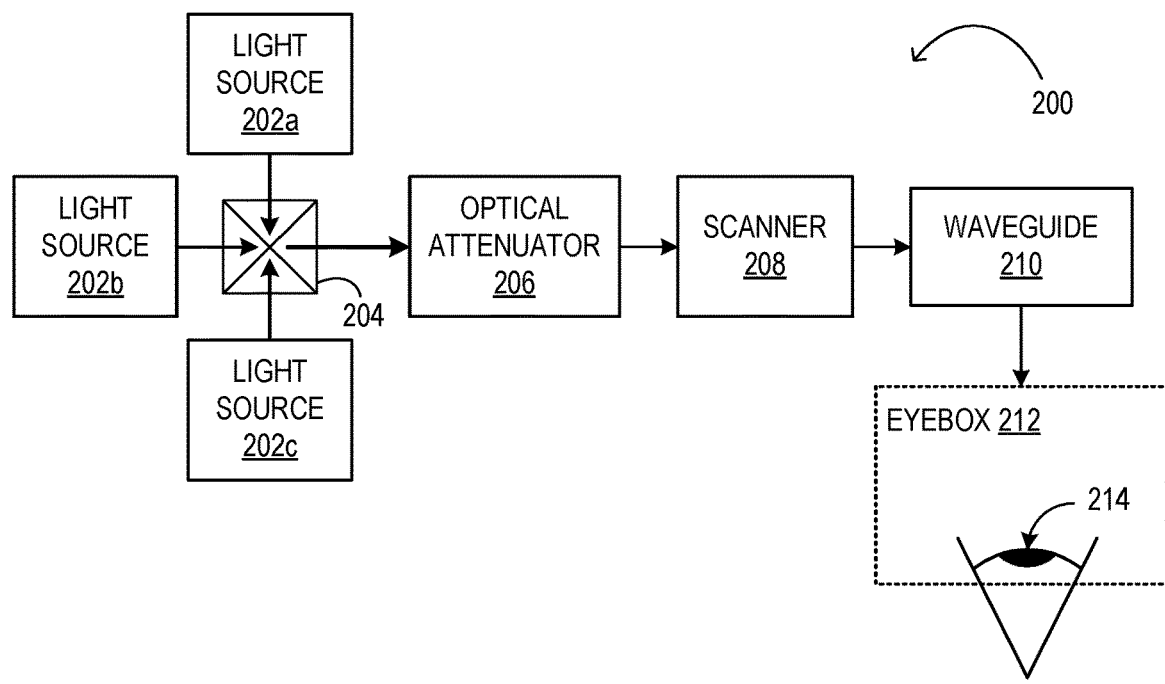
FIG. 2 shows a block diagram of an example optical device including one or more light sources, an optical attenuator, and a waveguide.

FIG. 2 shows a block diagram of an example display device 200 comprising an optical attenuator. Display device 200 includes light sources 202a, 202b, 202c, which each may be configured to output coherent, collimated light. Beam combiner 204 combines light from light sources 202a-c and directs the combined light to optical attenuator 206. Light from optical attenuator 206 is directed to scanner 208, which forms an image (e.g., MEMS device for raster scanning an image) by raster scanning the light received from the attenuator. The light is directed to waveguide 210 and output to an eyebox 212 for viewing by a user 214. In the example of FIG. 2, three light sources are shown, but any other suitable number of light sources can be used in other examples. It will be understood that various optical components not shown in FIG. 2 may be included in an optical system, and that various components shown in FIG. 2 may be omitted in some examples.

As described in more detail below, the optical attenuator comprises one or more switchable gratings that are tunable to controllably attenuate the brightness of the image output to eyebox 212. The terms "switchable" and the like as used herein indicate that the grating can be operated to selectively diffract a proportion of incident light toward an optical dump, while the terms "tunable" and the like as used herein indicate that the proportion of light diffracted is controllable over a range. In some examples, the display brightness may be tuned to output between 1% and 99% of light incident on the attenuator. Further, in some examples, an even larger dynamic range of luminosities may be achieved by using different attenuation methods for different luminosity ranges. As one such example, a display comprising a full brightness of 1000 nits may be dimmed to a first threshold using laser power control (e.g. 100 nits), and then as low as one nit using an optical attenuator according to the disclosed examples. The disclosed example attenuators further may have fast response times, transitioning from non-diffractive to diffractive in 10-20 microseconds (μs) in some examples.

In some examples, optical attenuator 206 may comprise a plurality of wavelength-selective switchable gratings to selectively attenuate light of different wavelength bands. For example, light sources 202a, 202b, 202c may be configured to output red, green, and blue light, respectively. As such, optical attenuator 206 may comprise respective switchable gratings to selectively attenuate the red, green, and blue light.

Figure 3:
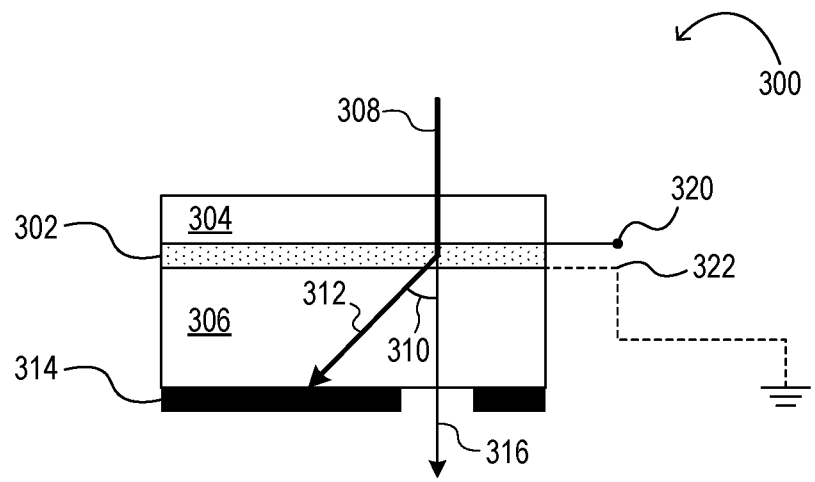
FIG. 3 shows a cross sectional view of an example optical attenuator comprising a switchable grating and a control electrode pair to tune a proportion of incident light diffracted towards an optical dump.

FIG. 3 shows an example optical attenuator 300 comprising a switchable grating 302 positioned between a cover plate 304 and a substrate 306. A control electrode pair comprising a first electrode 320 positioned between switchable grating 302 and cover plate 304, and a second electrode 322 positioned between switchable grating 302 and substrate 306, is controllable to apply a voltage across the switchable grating 302. It will be understood that the terms "substrate" and "cover plate" are not intended to imply any particular orientation for optical attenuator 300. Switchable grating 302 is configured to diffract light within a wavelength band at a diffraction angle. Likewise, the term "electrode pair" includes electrode configurations having two or more electrodes. As shown in FIG. 3, incident light 308 is received at switchable grating 302, and a proportion of the incident light is diffracted at angle 310. Diffracted light 312 is directed to an optical dump 314, while a remaining proportion of the incident light is not diffracted. As such, light 316 is attenuated relative to incident light 308.

The diffraction efficiency of switchable grating 302 is tunable based on the voltage applied across the grating. Switchable grating 302 may comprise a polymer dispersed liquid crystal (PDLC) grating. The diffraction efficiency of a PDLC switchable grating 302 decreases with increasing electric field. In the absence of an electric field across a PDLC, the incident light may be diffracted with a relatively high diffraction efficiency. As an applied voltage increases, a proportion of light diffracted decreases. As such, applying a voltage across switchable grating 302 tunes the diffraction efficiency, and thus the proportion of diffracted light 312. In some examples switchable grating 302 may be tuned to diffract between 1% and 99% of incident light. In other examples, a switchable grating may have any other suitable dynamic range. Cover plate 304, substrate 306, first electrode 320, and second electrode 322 each may comprise any suitable material. For example, the cover plate 304 and substrate 306 each can be formed from a material that is transparent to wavelengths of interest, including visibly transparent oxides and polymers for visible light applications, and/or materials transparent to other wavelengths (e.g. ultraviolet, infrared) for other applications. Likewise, the electrodes can be formed from a transparent conductor such as indium tin oxide.

Figure 4:
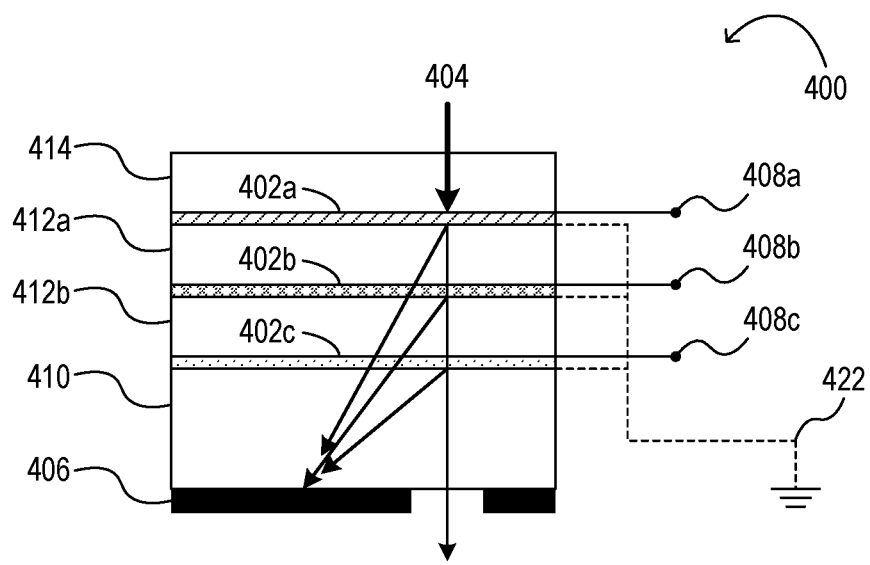
FIG. 4 shows an example optical attenuator comprising three switchable gratings in a stacked arrangement.

FIG. 4 shows an example optical attenuator 400 comprising three switchable gratings 402a-c arranged in a stacked configuration. A proportion of incident light 404 is diffracted at each grating toward an optical dump 406. In this example, each of the switchable gratings is configured to diffract light in a different wavelength band. For example, switchable grating 402a may be configured to diffract light in a blue wavelength band, switchable grating 402b may be configured to diffract light in a green wavelength band, and switchable grating 402c may be configured to diffract light in a red wavelength band. In other examples, optical attenuator 400 may comprise a different number of switchable gratings each of which may be configured to diffract light within any suitable wavelength band.

At each switchable grating 402a-c, the proportion of diffracted light is tunable based on an applied voltage across the grating. Electrode 408a applies a voltage across switchable grating 402a relative to a common electrode 422 to tune the proportion of incident light in the first wavelength band that is diffracted. Similarly, electrode 408b applies a voltage across switchable grating 402b relative to the common electrode 422 to tune a proportion of incident light in the second wavelength band that is diffracted. Further, electrode 408c applies a voltage across switchable grating 402c relative to the common electrode 422 to tune a proportion of incident light in the third wavelength band that is diffracted. As such, by controlling the voltages applied across switchable gratings 402a-c, a proportion of incident light diffracted at each of the three wavelength bands can be tuned to thereby attenuate incident light 404 with wavelength selectivity. In the example depicted, the three diffraction angles are different such that the diffracted light is directed to similar locations on the optical dump. In other examples, the diffraction angles may be equivalent, and the light of different colors may be diffracted toward different portions of an optical dump (which may be separate from one another or part of a contiguous structure).

Optical attenuator 400 further comprises a substrate 410, inter-grating layers 412a-b located between switchable gratings, and cover plate 414. In some examples, substrate 410 may comprise a relatively greater thickness (e.g., 150-250 µm), while inter-grating layers 412a-b and cover plate 414 may comprise a relatively lesser thickness (e.g., 25-75 µm). In other examples, these components may have any other suitable thicknesses. Inter-grating layers 412a-b may be formed from any suitable optically transparent dielectric materials, such as various oxides and polymers. In other examples, optical attenuator 400 may comprise one, two, four, or a greater number of switchable gratings.

Figure 5:
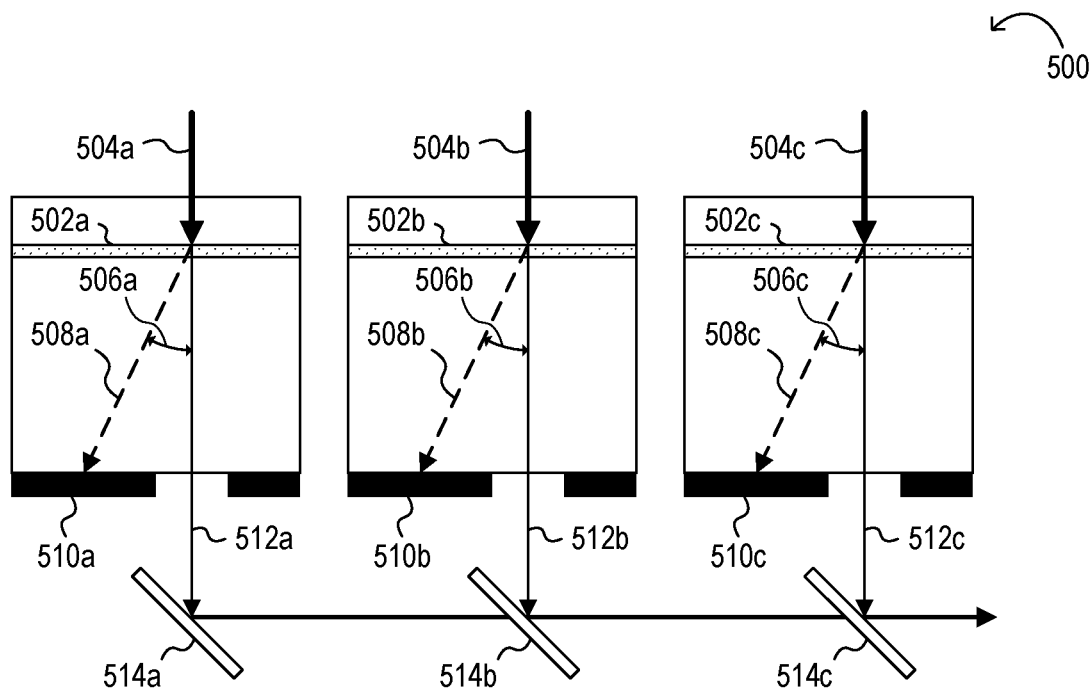
FIG. 5 shows an example optical attenuator comprising three switchable gratings in a spatially demultiplexed arrangement.

FIG. 5 shows an optical attenuator 500 comprising three switchable gratings 502a-c in a spatially demultiplexed arrangement. Each switchable grating 502a-c is configured to diffract light within a different wavelength band. At each switchable grating 502a-c, incident light 504a-c is diffracted at diffraction angle 506a-c, and the corresponding proportion of diffracted light 508a-c is directed to an optical dump 510a-c. The remaining proportion of light that is not diffracted (i.e., attenuated light 512a-c) may be combined using beam combiners 514a-c for output.

Figure 6:
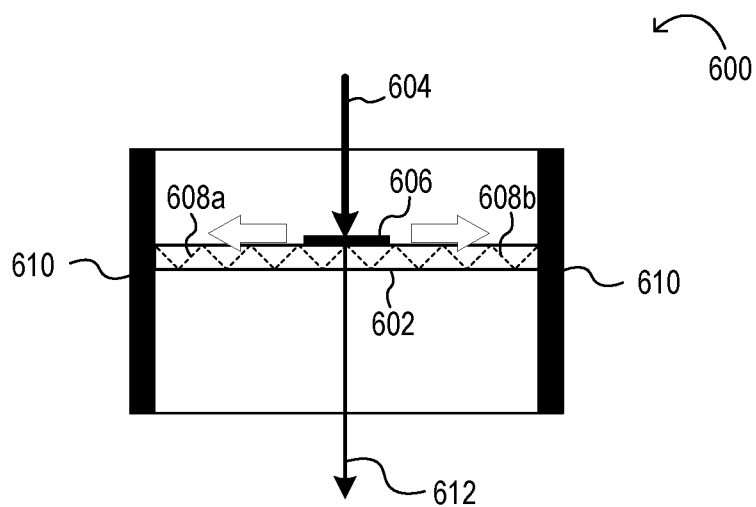
FIG. 6 shows an optical attenuator comprising a waveguide to direct diffracted light via total internal reflection to an optical dump.

FIG. 6 shows an example optical attenuator 600 comprising a waveguide 602 configured to direct diffracted light to an optical dump via total internal reflection (TIR). In the example shown, incident light 604 is diffracted at switchable grating 606 at a sufficiently high diffraction angle that diffracted light 608a, 608b is coupled into waveguide 602 and propagates through waveguide 602 (TIR) to optical dump 610. The remaining proportion of light that is not diffracted is output as attenuated light 612. As described above, the proportion of light diffracted at switchable grating 606 is tunable based on a voltage applied across switchable grating 606.

Figure 7:
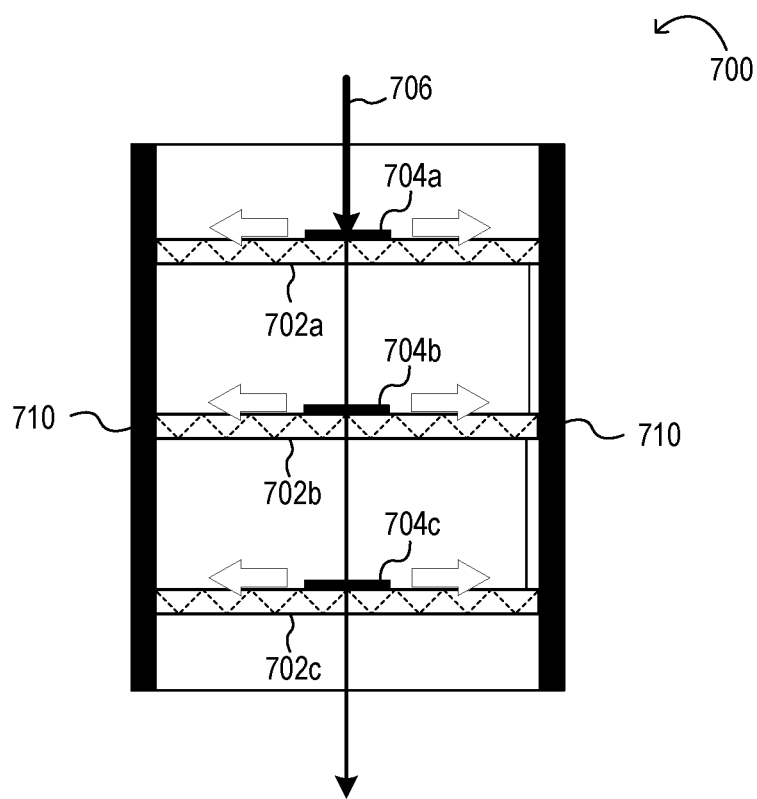
FIG. 7 shows an example attenuator comprising three switchable gratings in a stacked arrangement, and three corresponding waveguides to direct light diffracted by each grating to an optical dump.

FIG. 7 shows another example optical attenuator 700 comprising three switchable gratings 702a-c and three corresponding waveguides 704a-c in a stacked arrangement. Similar to the example described in FIG. 4, each of the three switchable gratings 702a-c is configured to diffract light in a different wavelength band. For example, incident light 706 may comprise light in a first, second, and third wavelength bands (e.g., red, green, and blue light). Light in the first wavelength band is diffracted at switchable grating 702a and propagates through waveguide 704a via TIR (dotted lines) to optical dump 710. Light in the second wavelength band is diffracted at switchable grating 702b and propagates via TIR through waveguide 704b to the optical dump. Likewise, light in the third wavelength band is diffracted at switchable grating 702c and propagates through waveguide 704c to the optical dump. As described above, the proportion of light diffracted at each switchable grating 702a-c is tunable based on a voltage applied across the switchable grating.

A variety of devices may incorporate optical attenuators according to the present disclosure for various different purposes. For example, in addition to controlling a brightness of a displayed image, an optical attenuator in a display device additionally or alternatively may be used to perform color correction. As a more specific example, due to defects and inconsistencies in waveguide manufacturing, a population of display devices may suffer from color non-uniformity. As such, an optical attenuator may be used to correct for color-nonuniformity in display devices within the population via wavelength-selective attenuation.

As another example, an optical attenuator may be used with telecommunications laser devices to modulate different colors of light to encode communications signals. Further, in such an example, a switchable tunable grating according to the present disclosure may be used to demultiplex the different wavelengths of light on a receiving end, such as by diffracting each signal-carrying wavelength in a combined beam into a separate waveguide or otherwise toward separate detectors.

Figure 8:
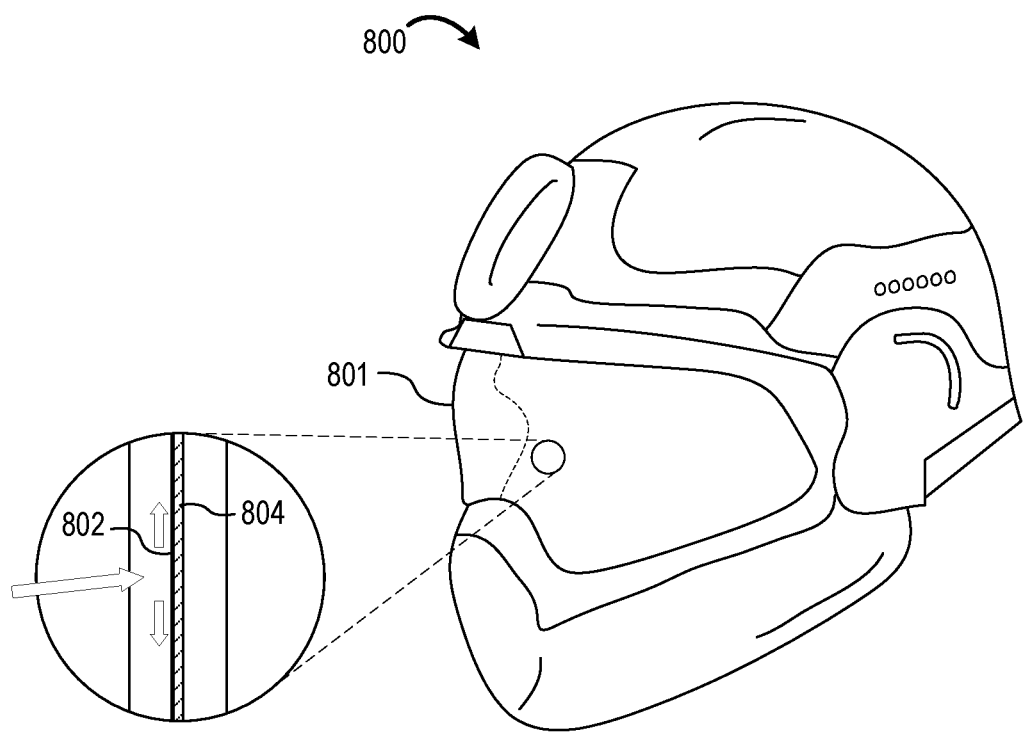
FIG. 8 shows an example optical device in the form of a helmet visor comprising a switchable grating.

As yet another example, an optical attenuator as disclosed may be used as in a helmet visor, as illustrated by example helmet 800 of FIG. 8. Such a helmet may be used, for example, in military applications. Viewing window 801 of helmet 800 can include an integrated an optical attenuator including a switchable grating 802, substrate/cover plate layers, transparent electrodes, and a waveguide 804 configured to receive light from the switchable grating to deliver the light to an optical dump. Such a tunable attenuator can be used to selectively protect against lasers, as an example. A controller may tune the diffraction efficiency of switchable grating 802 by applying a voltage across the grating, thereby diffracting a proportion of incident light in a wavelength band through the waveguide to an optical dump.

Figure 9:
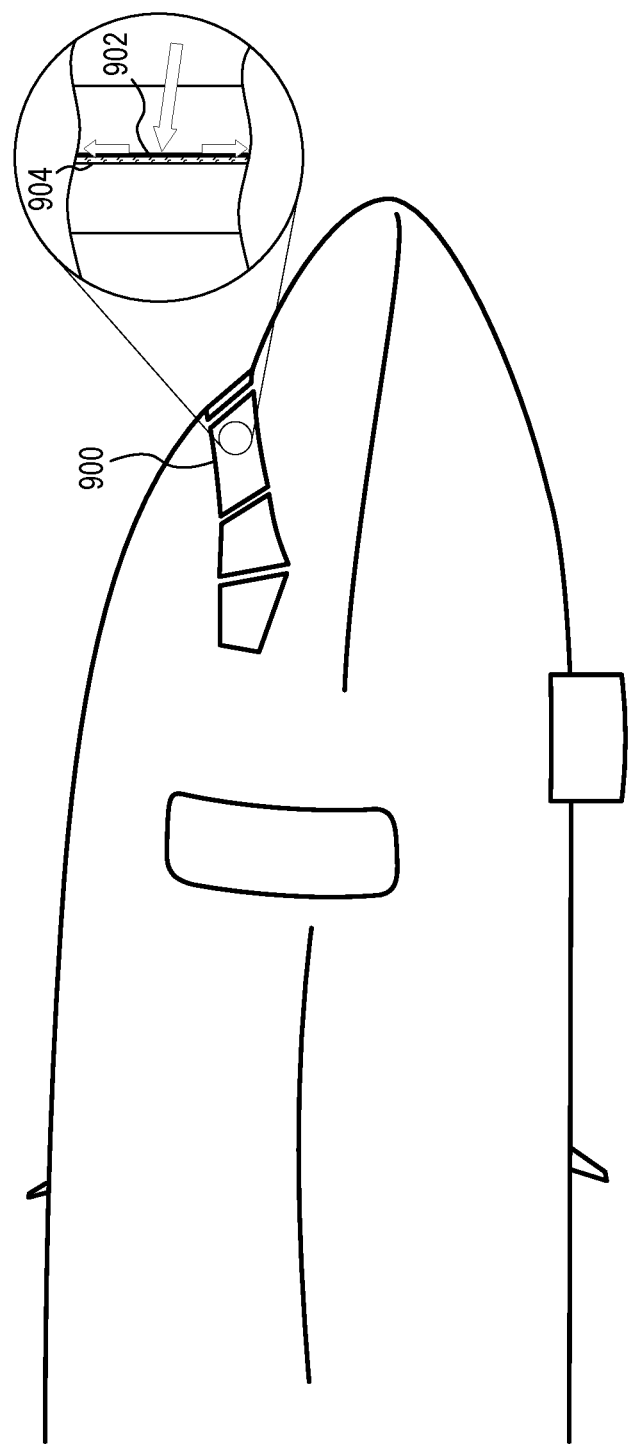
FIG. 9 shows another example optical device in the form of an airplane window comprising a switchable grating.

As another example, an optical attenuator as disclosed herein may be integrated into a cockpit window of an aircraft. Malicious actors have been known to attack airplanes with high power-lasers. Thus, an optical attenuator incorporated into an airplane window may provide protection against such attacks. FIG. 9 shows an example optical device in the form of an airplane viewing window 900. As shown in the inset, airplane viewing window 900 comprises a switchable grating 902 to diffract a proportion of incoming light into a waveguide 904. The proportion of incident light diffracted propagates through waveguide 904 to an optical dump located at the edges of the window. In some examples, the switchable grating 902 is configured to diffract wavelengths corresponding to laser light that is known to pose dangers to pilots. The diffraction efficiency of switchable grating 902 is tunable based on a voltage applied across the grating. As such, airplane viewing window 900 may be controlled to have a higher diffraction efficiency in environments with a greater risk of laser attacks (e.g. closer to the ground, closer to airports), and a lower diffraction efficiency in other relatively safer environments (e.g. at higher altitudes). In other examples, an optical attenuation system comprising a switchable grating may be incorporated into viewing windows of other vehicles (e.g., automobile, helicopter, etc.).

Figure 10:
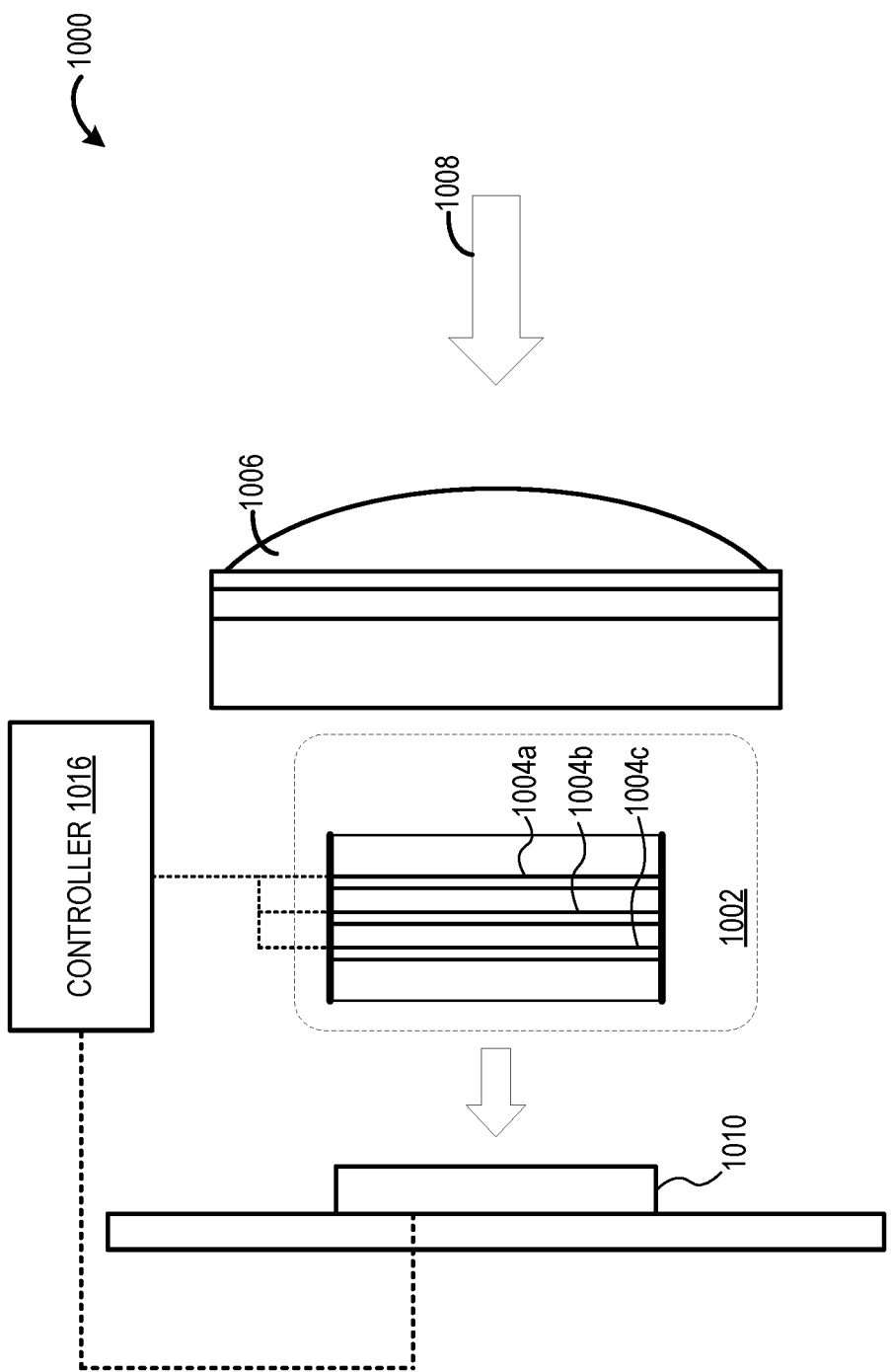
FIG. 10 shows another example optical device in the form of a camera comprising an optical attenuator configured to tune an amount of attenuated light that reaches an image sensor.

FIG. 10 schematically shows an example camera 1000 including an optical attenuator 1002. Optical attenuator 1002 may be configured to provide for color balancing, dynamic color corrections, and full bit color depth for camera 1000. Optical attenuator 1002 comprises switchable gratings 1004a-c, each configured to diffract incident light in a different wavelength band (e.g., red, green, and blue light). Camera 1000 further comprises a lens 1006 configured to focus light 1008 from a scene onto an image sensor 1010. Image sensor 1010 comprises a plurality of pixels, each pixel configured to measure an intensity of light received and output a corresponding value in bits.

In some examples, image sensor 1010 may be more sensitive to some colors of light than others. In this case, controller 1016 may control the voltage across each switchable grating 1004a-c to tune a proportion of incident light that is diffracted at the grating, thereby attenuating the light received at image sensor 1010 with wavelength selectivity. As such, camera 1000 may achieve color balance. Controller 1016 may control optical attenuator 1002 based on pixel sensor data from image sensor 1010, for example.

Optical attenuator 1002 may also be used to in color correction. For example, different environments may have different relative intensities of light across the visible spectrum (e.g., outdoor sunlight versus indoor neon light). Software may be employed to perform color corrections via gamma correction. However, this may lead to loss of bit color depth. In such cases, controller 1016 controls optical attenuator 1002 to perform wavelength selective optical attenuation by controlling each switchable grating 1004a-c to diffract a different proportion of incident light in the corresponding wavelength band. By attenuating different color light by different proportions, optical attenuator 1002 may perform color correction before the light is sensed at image sensor 1010, and help avoid performing gamma correction (with loss of bit color depth) after the light is sensed. Such wavelength selective attenuation may help preserve bit color depth and provide more vibrant color images in various lighting environments.

Figure 11:
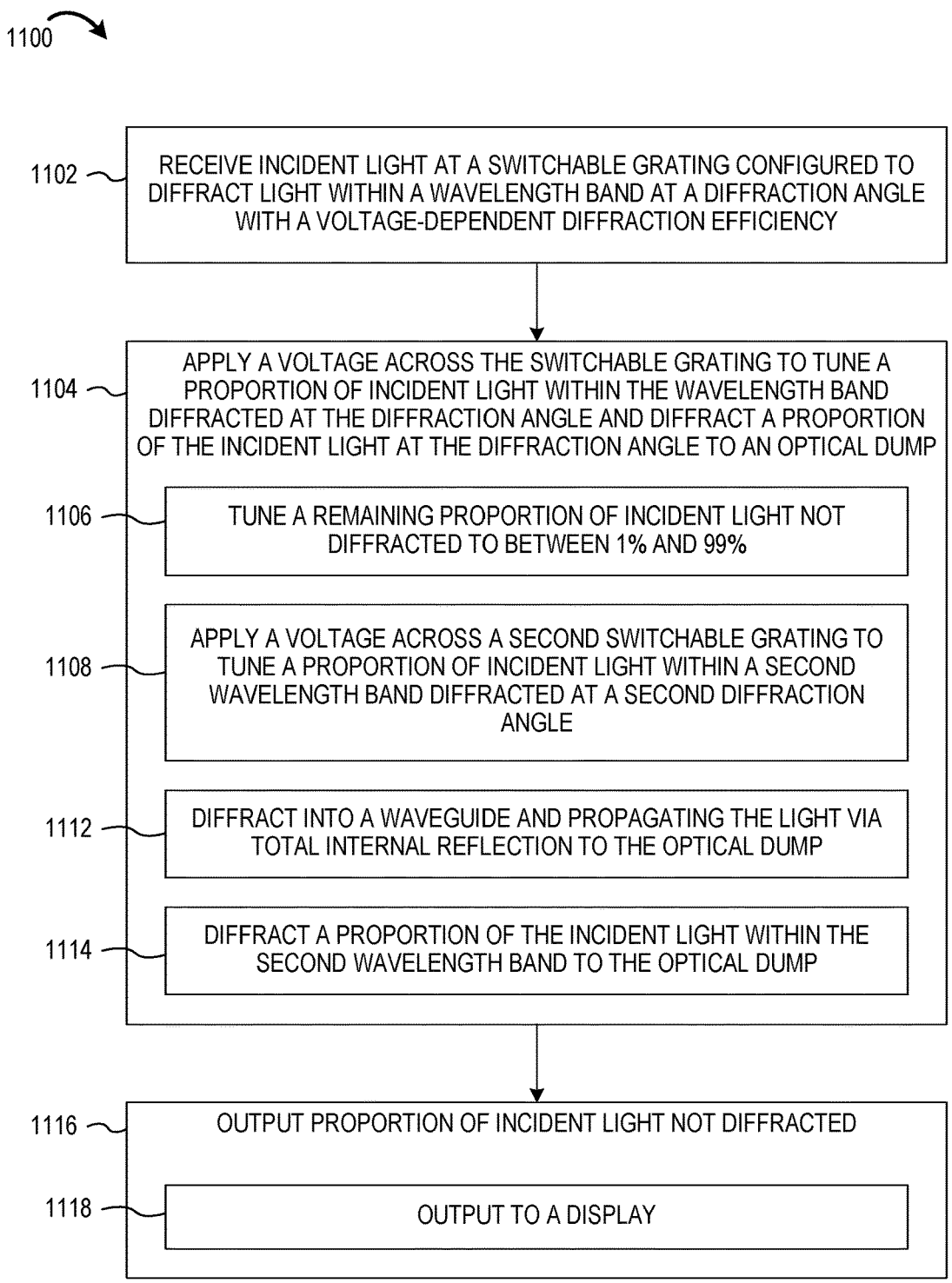
FIG. 11 is a flow diagram depicting an example method for attenuating an optical signal.

FIG. 11 is a flow diagram depicting an example method 1100 for attenuating light using a switchable grating. At 1102, method 1100 comprises receiving incident light at a switchable grating configured to diffract light within a wavelength band at a diffraction angle with a voltage-dependent diffraction efficiency. In some examples, the incident light is received from an image producing element of a display device. In other examples, the light is received from the environment. In still further examples, the light is received from a telecom device. In some examples, the incident light comprises light in one or more relatively narrow wavelength band, such as red, green, and/or blue laser light. In other examples, the incident light comprises light in a relatively broad wavelength band of IR, visible, and/or UV light.

At 1104, the method further comprises applying a voltage across the switchable grating to tune a proportion of incident light within the wavelength band diffracted at the diffraction angle and diffract a proportion of the incident light to an optical dump. In some examples, at 1106, the method comprises tuning the diffraction intensity to output a proportion of incident light between 1% and 99%. In some examples, at 1108 the method further comprises applying a voltage across a second switchable grating to tune a proportion of incident light within a second wavelength band diffracted at a second diffraction angle. Further, in some such examples, the method further comprises applying a voltage across a third switchable grating to tune a proportion of incident light within a third wavelength band. In such examples, the first, second, and third wavelength bands may correspond to red, blue and green light. In other examples, two or fewer switchable gratings may be used, or four or more switchable gratings may be used to attenuate light with wavelength-selectivity for a corresponding four or more colors.

In some examples, at 1112, the light is diffracted into a waveguide and propagates via total internal reflection to the optical dump. In some examples when 1108 is included, the method comprises, at 1114, diffracting the proportion of incident light within the second wavelength band to the optical dump.

Method 1100 further comprises, at 1116, outputting a proportion of incident light not diffracted. In some examples, at 1118, the output light is used for displaying an image. In other examples, the method comprises outputting attenuated light to an image sensor, or into a telecommunications fiber optic channel, as examples.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
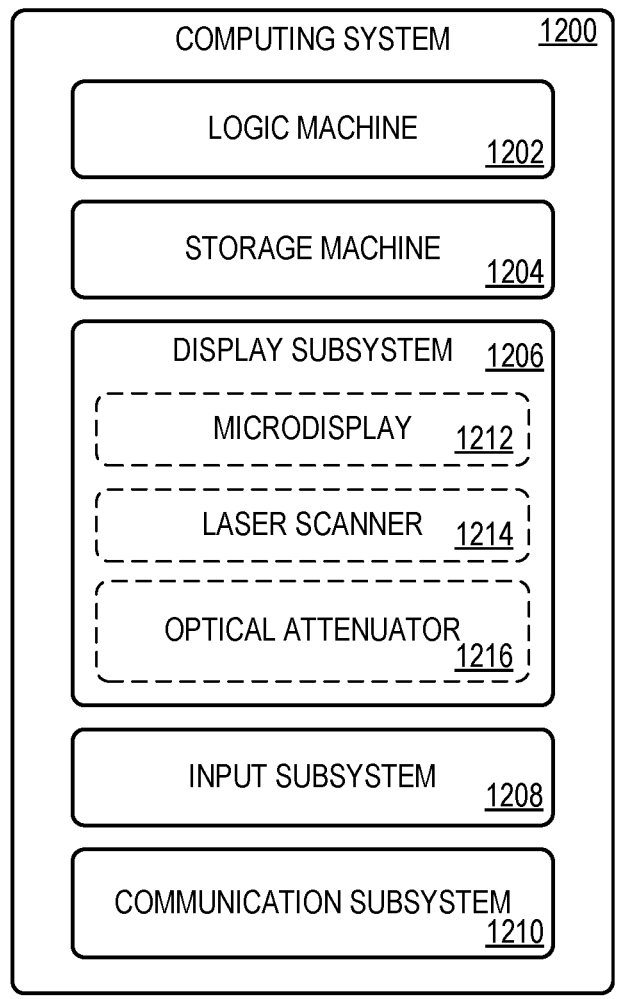
FIG. 12 is a block diagram of an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices. Computing system 1200 can represent the computing system of any of the optical devices described herein.

Computing system 1200 includes a logic machine 1202 and a storage machine 1204. Computing system 1200 may optionally include a display subsystem 1206, input subsystem 1208, communication subsystem 1210, and/or other components not shown in FIG. 12.

Logic machine 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1204 includes one or more physical devices configured to hold instructions executable by the logic machine to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1206 may be used to present a visual representation of data held by storage machine 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. For example, display subsystem may include a microdisplay 1212 or a laser scanner 1214. Display subsystem may also include an optical attenuator 1216, which may be controlled by logic machine 1202 to perform wavelength-selective optical attenuation according to the method described herein. Such display devices may be combined with logic machine 1202 and/or storage machine 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

Another example provides an optical attenuator, comprising a switchable grating configured to diffract light within a wavelength band at a diffraction angle, an electrode pair configured to apply a voltage across the switchable grating to tune a proportion of incident light diffracted at the diffraction angle, and an optical dump to receive the proportion of incident light diffracted. In some such examples, the switchable grating is configured such that the proportion of incident light diffracted decreases with increasing applied voltage. In some such examples, the switchable grating alternatively or additionally comprises a polymer dispersed liquid crystal grating. In some such examples, the switchable grating is a first switchable grating, the optical band is a first optical band, and wherein the optical attenuator alternatively or additionally further comprises a second switchable grating configured to diffract light within a second wavelength band, and a second electrode pair configured to apply a voltage across the second switchable grating to tune a second proportion of incident light diffracted toward the optical dump. In some such examples, the first switchable grating and second switchable grating alternatively or additionally are arranged in a stacked arrangement. In some such examples, the proportion of incident light alternatively or additionally is diffracted into a waveguide and propagates via total internal reflection to the optical dump. In some such examples, the proportion of diffracted light alternatively or additionally is tunable within a range of between 1% and 99% of light incident on the optical attenuator. In some such examples, the switchable grating is a first switchable grating configured to diffract light within a red wavelength band at a first diffraction angle, the proportion of incident light is a proportion of incident red light, and the optical attenuator alternatively or additionally further comprises a second switchable grating configured to diffract light within a green wavelength band at a second diffraction angle, and a third switchable grating configured to diffract light within a blue wavelength band at a third diffraction angle.

Another example provides a method for attenuating light, the method comprising receiving incident light at a switchable grating configured to diffract light within a wavelength band at a diffraction angle with a voltage-dependent diffraction efficiency, applying a voltage across the switchable grating to tune a proportion of incident light within the wavelength band diffracted at the diffraction angle, and diffracting a proportion of the incident light at the diffraction angle to an optical dump. In some examples, diffracting the proportion of incident light alternatively or additionally comprises diffracting the proportion of incident light into a waveguide and propagating the light via total internal reflection to the optical dump. In some such examples, applying a voltage across the switchable grating alternatively or additionally comprises tuning a remaining proportion of incident light not diffracted to between 1% and 99%. In some such examples, the switchable grating is a first switchable grating and the wavelength band is a first wavelength band, and the method alternatively or additionally further comprises applying a voltage across a second switchable grating to tune a proportion of incident light within a second wavelength band diffracted at a second diffraction angle, and diffracting a second proportion of the incident light within the second wavelength band to the optical dump.

Another example provides an optical device, comprising one or more optical attenuators, each comprising one or more switchable gratings configured to diffract incident light at a diffraction angle, and a controller configured to, for each switchable grating, control the switchable grating to, based on a voltage applied across the switchable grating, tune a proportion of the incident light that is diffracted. In some such examples, the optical device comprises one or more light sources configured to output the light at the one or more wavelength bands, the light at a wavelength band directed to a corresponding switchable grating at the wavelength band. In some such examples, the one or more optical attenuators alternatively or additionally comprises a plurality of switchable gratings in a stacked arrangement. In some such examples, the one or more optical attenuators comprises a plurality of optical attenuators that are spatially demultiplexed. In some such examples, the proportion of incident light is diffracted into a waveguide and propagates via total internal reflection to an optical dump. In some such examples, the optical device alternatively or additionally comprises a viewing window comprising the one or more switchable gratings. In some such examples, the optical device alternatively or additionally comprises a laser scanner configured to output a scanned beam image. In some such examples, the optical device alternatively or additionally comprises a camera, and wherein the one or more optical attenuators are positioned upstream of an image sensor to attenuate light received by the image sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical attenuator, comprising:
a first switchable grating configured to diffract light within a red wavelength band at a first diffraction angle;
a second switchable grating configured to diffract light within a green wavelength band at a second diffraction angle;
a third switchable grating configured to diffract light within a blue wavelength band at a third diffraction angle;
a first electrode pair configured to apply a voltage across the first switchable grating to tune a first proportion of incident light diffracted at the first diffraction angle;
a second electrode pair configured to apply a voltage across the second switchable grating to tune a second proportion of incident light diffracted at the second diffraction angle;
a third electrode pair configured to apply a voltage across the second switchable grating to tune a third proportion of incident light diffracted at the third diffraction angle; and
an optical dump, wherein the optical attenuator is configured to perform color correction by diffracting at least the first proportion of incident light and the second proportion of the incident light to the optical dump, the second proportion different than the first proportion.

2. The optical attenuator of claim 1, wherein each of the first switchable grating, the second switchable grating, and the third switchable grating is configured to diffract a decreasing proportion of incident light with increasing applied voltage.

3. The optical attenuator of claim 1, wherein each of the first switchable grating, the second switchable grating, and the third switchable grating comprises a polymer dispersed liquid crystal grating.

4. The optical attenuator of claim 1, wherein the first switchable grating, the second switchable grating, and the third switchable grating are arranged in a stacked arrangement.

5. The optical attenuator of claim 1, wherein the first proportion of incident light is diffracted into a waveguide and propagates via total internal reflection to the optical dump.

6. The optical attenuator of claim 1, wherein the proportion of diffracted light at the first diffraction angle is tunable within a range of between 1% and 99% of light incident on the optical attenuator, the proportion of diffracted light at the second diffraction angle is tunable within a range of between 1% and 99% of light incident on the optical attenuator, and the proportion of diffracted light at the third diffraction angle is tunable within a range of between 1% and 99% of light incident on the optical attenuator.

7. A method for attenuating light, the method comprising:
receiving incident light at a first switchable grating configured to diffract light within a first wavelength band at a first diffraction angle with a voltage-dependent diffraction efficiency;
applying a voltage across the first switchable grating to tune a first proportion of incident light within the first wavelength band diffracted at the first diffraction angle;
diffracting the first proportion of the incident light within the first wavelength band at the first diffraction angle to an optical dump;
receiving incident light at a second switchable grating with a voltage-dependent diffraction efficiency configured to diffract light within a second wavelength band at a second diffraction angle, the second wavelength band comprising a different color light than the first wavelength band;
applying a voltage across a second switchable grating to tune a second proportion of incident light within a second wavelength band diffracted at a second diffraction angle; and
perform color correction by diffracting the second proportion of the incident light within the second wavelength band to the optical dump, the second proportion different than the first proportion.

8. The method of claim 7, wherein diffracting the first proportion of incident light comprises diffracting the first proportion of incident light into a waveguide and propagating the light via total internal reflection to the optical dump.

9. The method of claim 7, wherein applying a voltage across the first switchable grating comprises tuning a remaining proportion of incident light not diffracted to between 1% and 99%.

10. The method of claim 7, wherein the first wavelength band is a red wavelength band and the second wavelength band is a green wavelength band, and the method further comprising:
applying a voltage across a third switchable grating to tune the third proportion of incident light within a blue wavelength band diffracted at a third diffraction angle; and
diffracting the third proportion of the incident light within the blue wavelength band to the optical dump, wherein the third proportion is different than the first proportion and the second proportion.

11. An optical device, comprising:
a plurality of switchable gratings configured to diffract incident light at a diffraction angle, each switchable grating of the plurality of switchable gratings configured to diffract light at a corresponding wavelength band; and
a controller configured to, for each switchable grating, control the switchable grating to, based on a voltage applied across the switchable grating, perform color correction by tuning a proportion of the incident light at the respective wavelength band that is diffracted.

12. The optical device of claim 11, further comprising one or more light sources configured to output the light at the corresponding wavelength bands, the light at a wavelength band directed to a corresponding switchable grating at the wavelength band.

13. The optical device of claim 11, wherein the plurality of switchable gratings are in a stacked arrangement.

14. The optical device of claim 11, wherein the one or more optical attenuators comprises a plurality of optical attenuators that are spatially demultiplexed.

15. The optical device of claim 11, wherein the proportion of incident light is diffracted into a waveguide and propagates via total internal reflection to an optical dump.

16. The optical device of claim 15, wherein the optical device comprises a viewing window comprising the one or more switchable gratings.

17. The optical device of claim 11, wherein the optical device comprises a laser scanner configured to output a scanned beam image.

18. The optical device of claim 11, wherein the optical device comprises a camera, and wherein the plurality of switchable gratings are positioned upstream of an image sensor to attenuate light received by the image sensor.

19. The optical device of claim 11, wherein the controller is configured to perform color balancing using the plurality of switchable gratings.

\* \* \* \* \*